US012742520B1

(12) United States Patent
Duan et al.

(10) Patent No.: US 12,742,520 B1
(45) Date of Patent: Sep. 22, 2026

(54) REFILLABLE PROPANE GAS TANK

(71) Applicant: CAMINOTEK LLC, Danville, CA (US)

(72) Inventors: Qi Duan, Lengshuijiang City (CN); Shuai Li, Changsha City (CN)

(73) Assignee: CAMINOTEK LLC, Danville, CA (US)

( * ) Notice: Subject to any disclaimer, the term of this patent is extended or adjusted under 35 U.S.C. 154(b) by 52 days.

(21) Appl. No.: 19/337,542

(22) Filed: Sep. 23, 2025

(30) Foreign Application Priority Data

Sep. 16, 2025 (CN) ........................ 202521993056.1

(51) Int. Cl.
*F17C 5/02* (2006.01)
*F17C 13/04* (2006.01)

(52) U.S. Cl.
CPC ................ *F17C 5/02* (2013.01); *F17C 13/04* (2013.01); *F17C 2205/0332* (2013.01); *F17C 2221/035* (2013.01)

(58) Field of Classification Search
CPC .. F17C 5/02; F17C 5/007; F17C 13/04; F17C 2205/0332; F17C 2221/035
See application file for complete search history.

(56) References Cited

U.S. PATENT DOCUMENTS

| | | | | |
|---|---|---|---|---|
| 3,519,035 | A * | 7/1970 | Remane | G01F 11/32 141/52 |
| 6,016,834 | A * | 1/2000 | Leidl | B60K 15/01 137/571 |
| 8,479,767 | B2 * | 7/2013 | Newman | F17C 13/04 62/50.7 |
| 9,464,760 | B2 * | 10/2016 | Tsai | F17C 7/00 |
| 10,865,884 | B2 * | 12/2020 | Newman | F16K 5/0407 |
| 10,914,425 | B2 * | 2/2021 | Newman | F17C 13/04 |
| 12,287,068 | B2 * | 4/2025 | Quinn | F17C 13/04 |
| 2011/0094608 | A1 * | 4/2011 | Lane, III | F17C 13/04 137/558 |
| 2014/0166671 | A1 * | 6/2014 | Downie | F17C 5/02 141/4 |
| 2016/0311675 | A1 * | 10/2016 | Brown | F17C 5/00 |
| 2022/0113086 | A1 * | 4/2022 | Del Campo | F17C 5/04 |

* cited by examiner

*Primary Examiner* — Nicolas A Arnett

(57) ABSTRACT

A refillable propane gas tank includes a propane tank body, a valve main body, a first sealing valve, a second sealing valve, and a liquid injecting head. The valve main body includes a liquid injecting channel and a pressure relief channel. The pressure relief channel includes a first air outlet. The first sealing valve is for sealing the liquid injecting channel. The second sealing valve is for sealing the first air outlet. The liquid injecting head is provided with a liquid injecting pipe, a top pressing structure and an overflow port. When the liquid injecting head is connected to the valve main body, the liquid injecting pipe is configured for pushing the first sealing valve to an first open position. The top pressing structure is configured for pushing the second sealing valve to a second open position to make the second sealing valve open the first air outlet.

20 Claims, 17 Drawing Sheets

REFILLABLE PROPANE GAS TANK

CROSS-REFERENCE TO RELATED APPLICATIONS

The application claims priority of Chinese patent application CN2025219930561, filed on Sep. 16, 2025, which is incorporated herein by reference in its entirety.

TECHNICAL FIELD

The present invention relates to the field of gas tank, in particular to a refillable propane gas tank.

BACKGROUND ART

The existing propane gas tanks on the market are mostly disposable, greatly increasing the use cost of the user. Moreover, the recycling problem of the used propane gas tank is also very difficult and extremely environmentally unfriendly.

SUMMARY

In order to overcome the shortcomings of the prior art, the present invention provides a refillable propane gas tank. The refillable propane gas tank includes a propane tank body, a valve main body, a first sealing valve, a second sealing valve and a liquid injecting head.

The propane tank body is provided with an accommodating cavity and a mounting opening, the accommodating cavity is configured for accommodating propane.

The valve main body is connected to an inner wall of the mounting opening. The valve main body is provided with a liquid injecting channel and a pressure relief channel, and the liquid injecting channel and the pressure relief channel are both in communication with the accommodating cavity. The pressure relief channel is provided with a first air outlet.

The first sealing valve is configured for sealing the liquid injecting channel. The first sealing valve is movable between a first open position and a first closed position. When the first sealing valve is in the first open position, the first sealing valve is configured for opening the liquid injecting channel. When the first sealing valve is in the first closed position, the first sealing valve is configured for sealing the liquid injecting channel.

The second sealing valve is configured for sealing the first air outlet. The second sealing valve is movable between a second open position and a second closed position. When the second sealing valve is in the second open position, the first air outlet is opened. When the second sealing valve is in the second closed position, the second sealing valve is configured for sealing the first air outlet.

The liquid injecting head is detachably connected to the valve main body; the liquid injecting head is provided with a liquid injecting pipe, a top pressure structure and an overflow port; when the liquid injecting head is connected to the valve main body, the liquid injecting pipe is configured for pushing the first sealing valve to the first open position, so as to make the first sealing valve open the liquid injecting channel, so that the liquid injecting pipe is in communication with the liquid injecting channel; the top pressing structure pushes the second sealing valve to the second open position, so as to make the second sealing valve open the first air outlet, so that the first air outlet is in communication with the overflow port.

The present utility model has the following beneficial effects. The present utility model provides a propane tank body including the propane tank body. The propane tank body is provide with the accommodating cavity and the mounting opening, and the accommodating cavity is configured for accommodating propane. The propane tank body further includes the valve main body. The valve main body is connected to the inner wall of the mounting opening. The valve main body is provided with the liquid injecting channel and the pressure relief channel. The liquid injecting channel and the pressure relief channel are both in communication with the accommodating cavity. The pressure relief channel is provided with the first air outlet. The propane tank body further includes the first sealing valve. The first sealing valve is configured for sealing the liquid injecting channel, and the first sealing valve is movable between the first open position and the first closed position. When the first sealing valve is in the first open position, the first sealing valve is configured for opening the liquid injecting channel; when the first sealing valve is in the first closed position, the first sealing valve is configured for sealing the liquid injecting channel. The propane tank body includes the second sealing valve. The second sealing valve is configured for sealing the first air outlet. The second sealing valve is movable between the second open position and the second closed position. When the second sealing valve is in the second open position, the first air outlet is opened; when the second sealing valve is in the second closed position, the second sealing valve is configured for sealing the first air outlet. The propane tank body includes the liquid injecting head. The liquid injecting head is detachably connected to the valve main body. The liquid injecting head is provided with the liquid injecting pipe, the top pressure structure and the overflow port. When the liquid injecting head is connected to the valve main body, the liquid injecting pipe is configured for pushing the first sealing valve to the first open position, so as to make the first sealing valve opens the liquid injecting channel, so that the liquid injecting pipe is in communication with the liquid injecting channel. The top pressing structure pushes the second sealing valve to the second open position to make the second sealing valve open the first air outlet, so that the first air outlet is in communication with the overflow port. Therefore, the user can connect the liquid injecting head with the valve main body when the user needs to fill the propane tank body with propane, to make the liquid injecting pipe push the first sealing valve to the first open position, so as to release the seal of the first sealing valve on the liquid injecting channel. Thus the liquid injecting pipe is in communication with the liquid injecting channel, facilitating liquid propane to be injected into the propane tank body through the liquid injecting pipe of the liquid injecting head. Moreover, the top pressing structure pushes the second sealing valve to the second open position to make the second sealing valve open the first air outlet, so that the first air outlet is in communication with the overflow port, facilitating the gas in the propane tank body to be discharged through the first air outlet and the overflow port. When the propane tank body is filled, propane in the propane tank body flows out through the first air outlet and the overflow port, and the propane atomizes the instant it overflows the overflow port. The user can observe whether an atomization phenomenon occurs to determine whether the propane tank body has been filled. After the propane tank body is filled, the liquid injecting head can be detached from the valve main body, the first sealing valve returns to the first closed position and seals the liquid injecting channel; the second sealing valve returns to the second closed position and seals the first air outlet. So that the propane in the propane tank body is prevented from leaking through the liquid injecting channel and the first air outlet. In addition, after the propane in the propane tank body is depleted, the propane can be injected into the propane tank body again through the liquid injecting pipe and the liquid injecting channel, so that the propane tank body can be reused.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
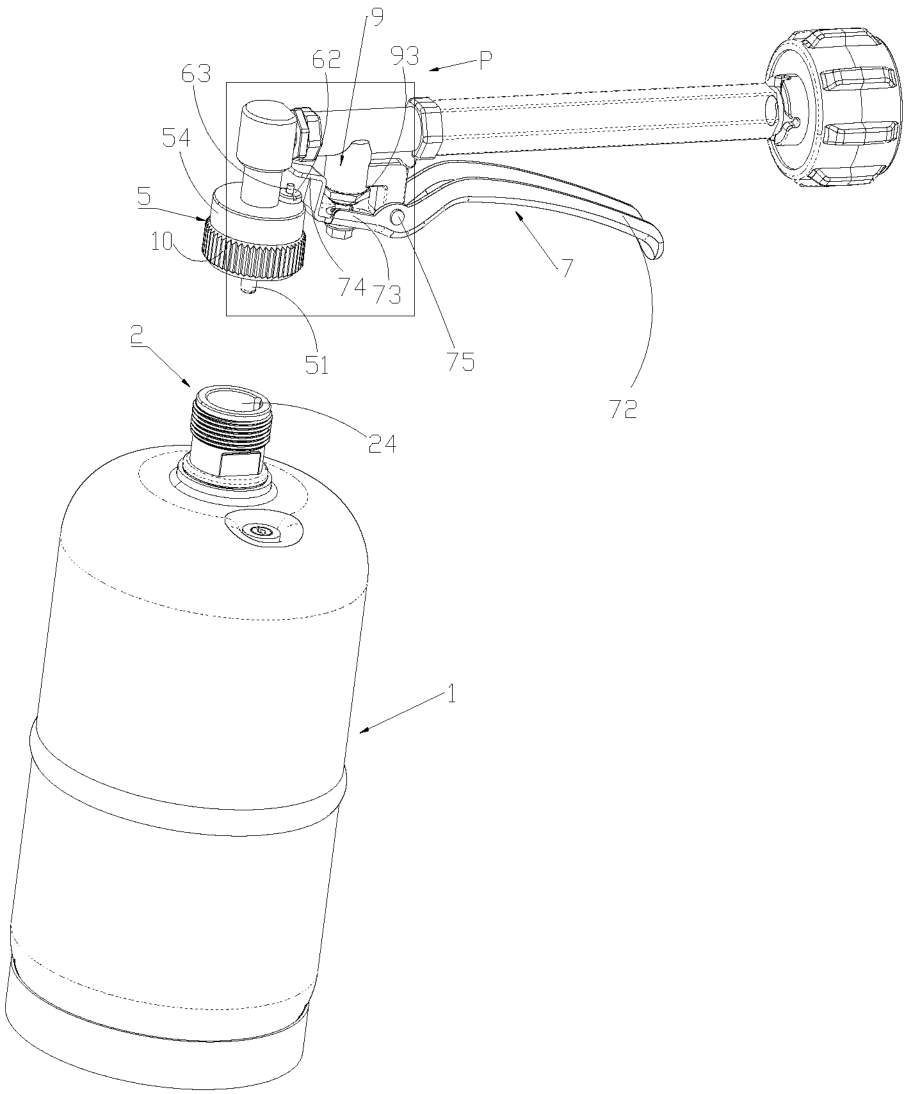
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
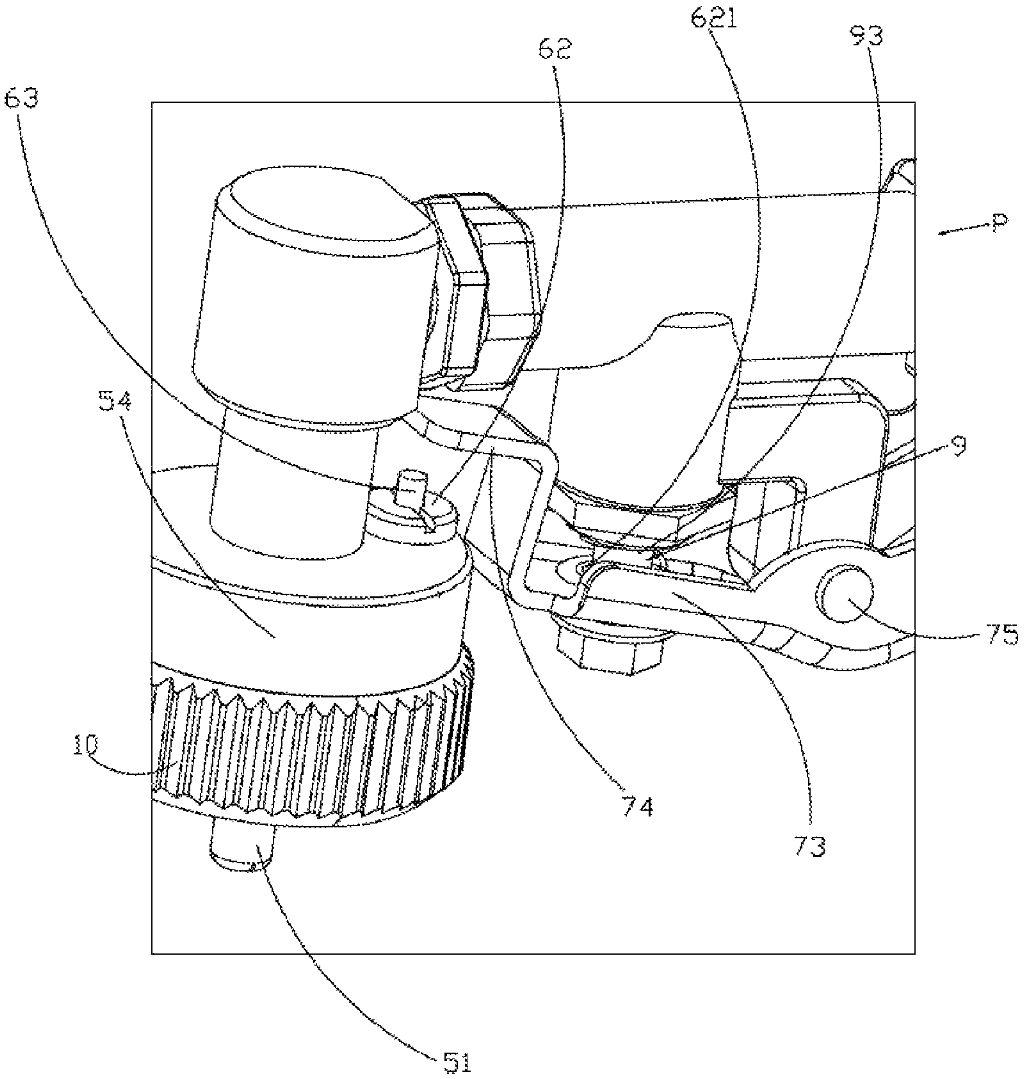
FIG. 2 is an enlarged view of P area of FIG. 1.
Figure 3:
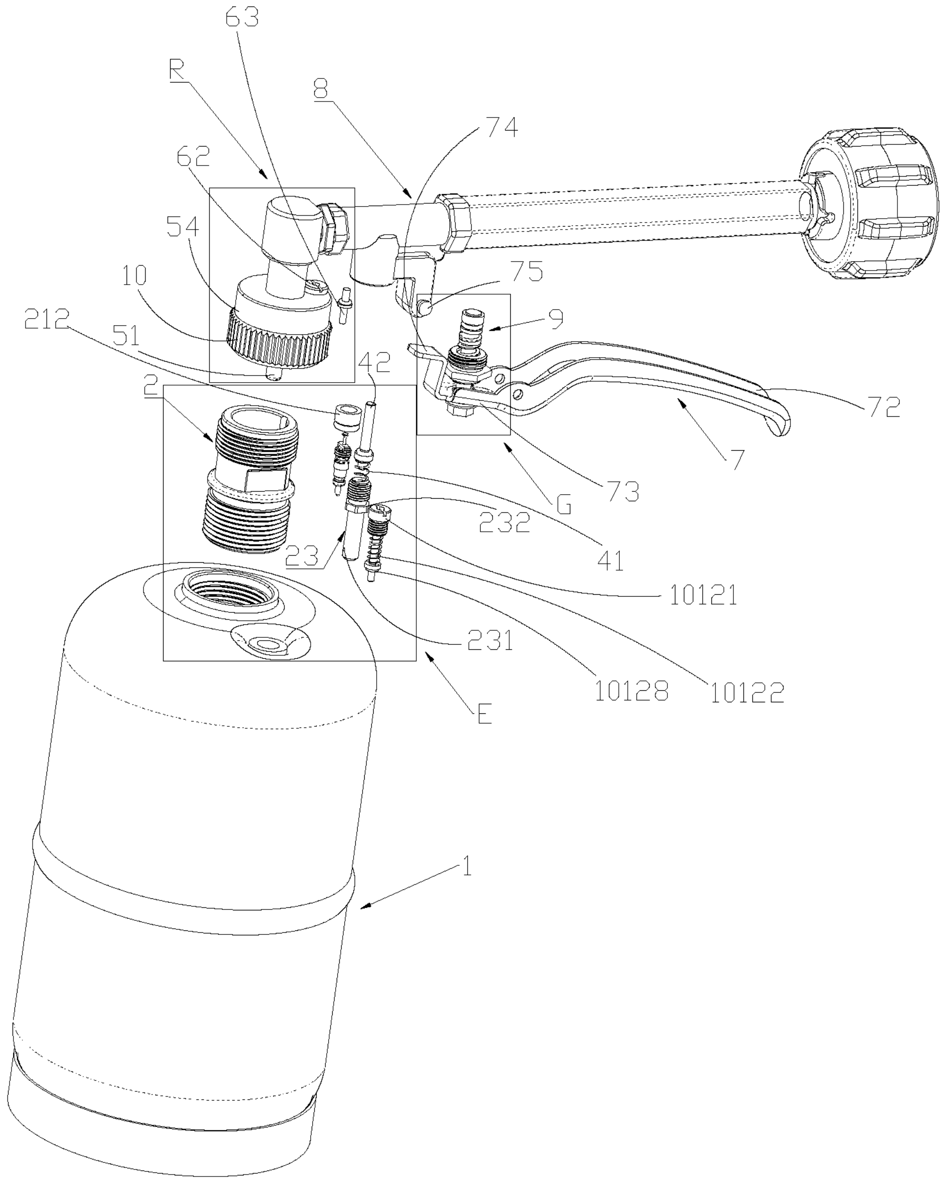
FIG. 3 is an exploded view of the present invention.
Figure 4:
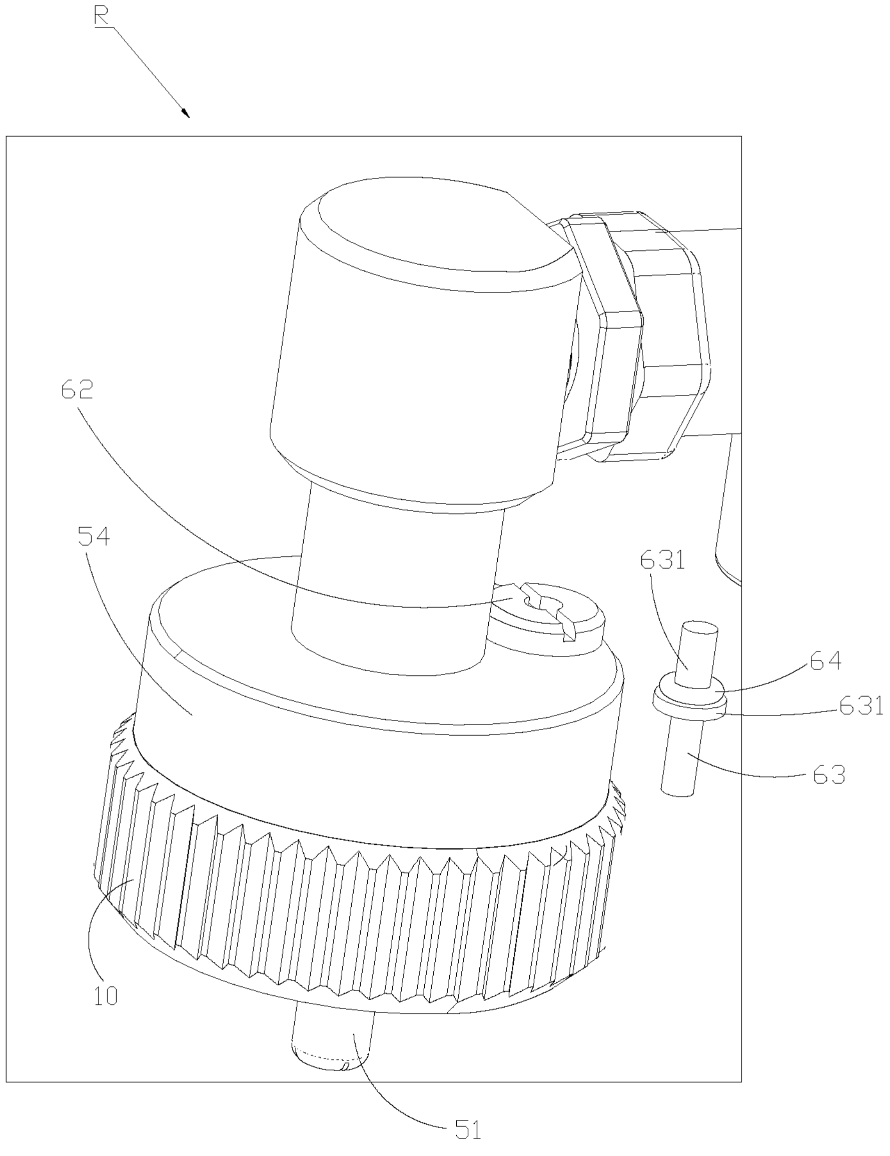
FIG. 4 is an enlarged view of R area of FIG. 3.
Figure 5:
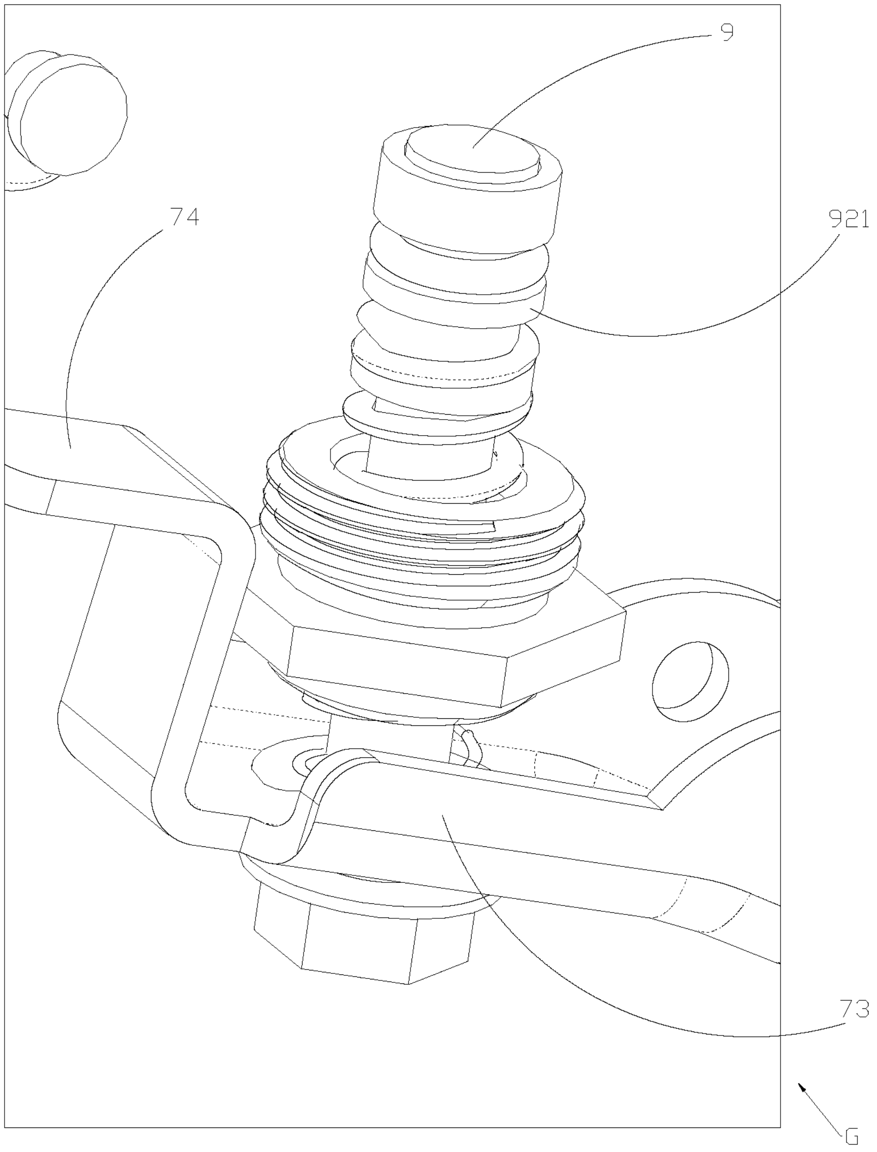
FIG. 5 is an enlarged view of G area of FIG. 3.
Figure 6:
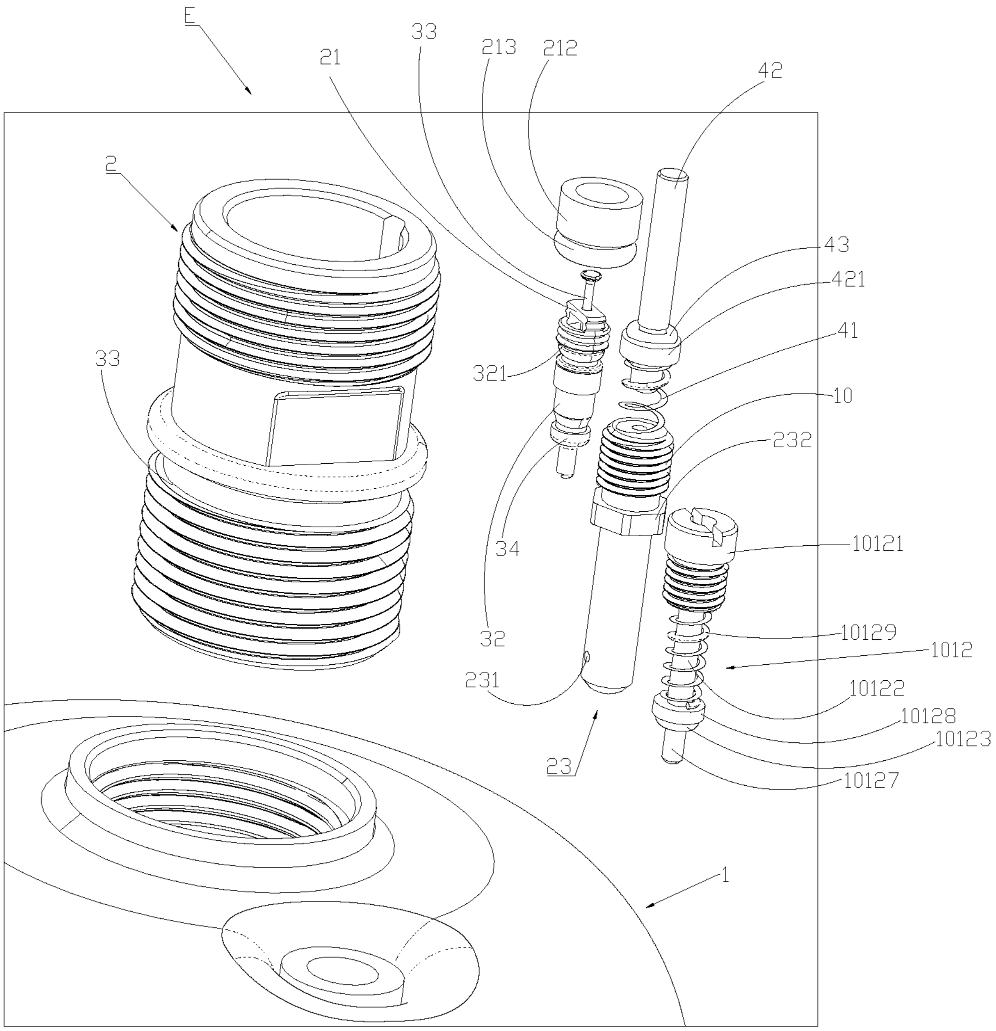
FIG. 6 is an enlarged view of E area of FIG. 3.
Figure 7:
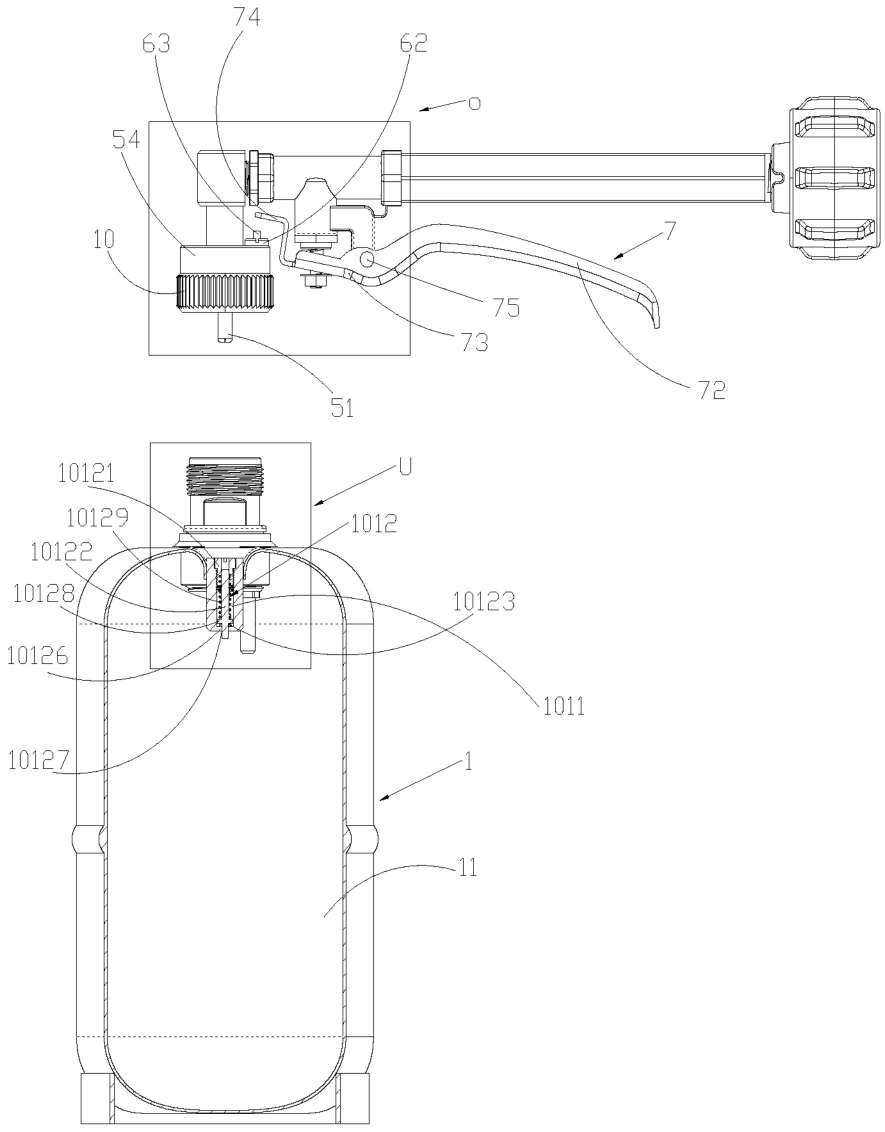
FIG. 7 is a cross-sectional view taken along a valve main body.
Figure 8:
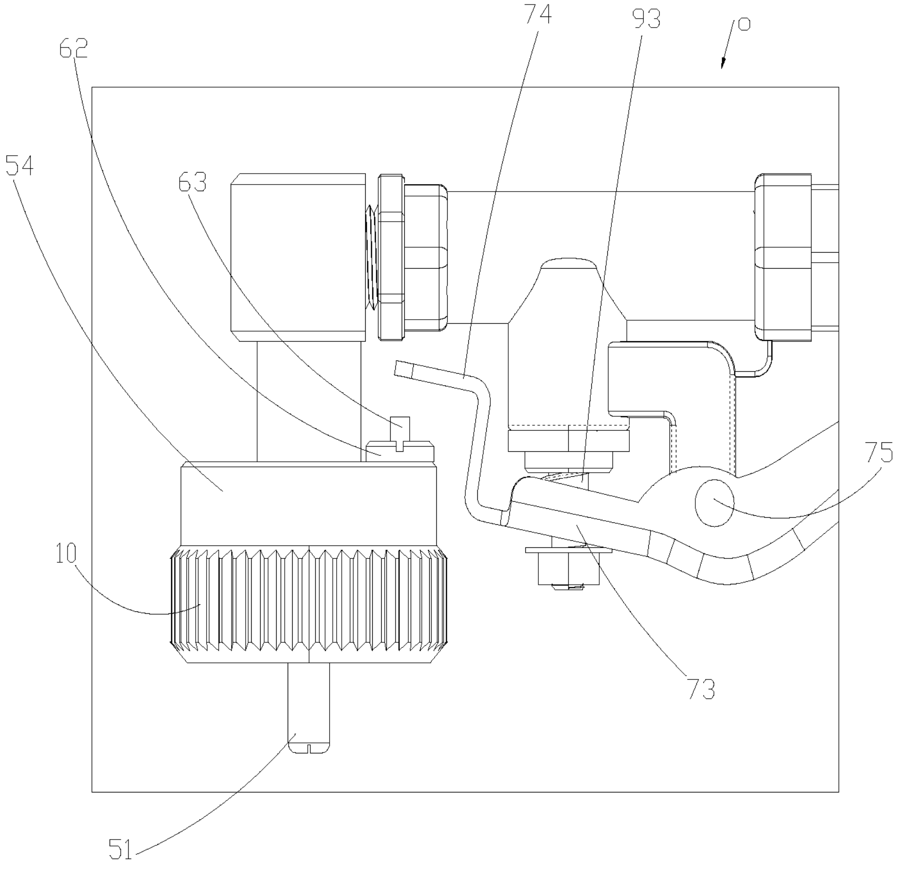
FIG. 8 is an enlarged view of O area of FIG. 7.
Figure 9:
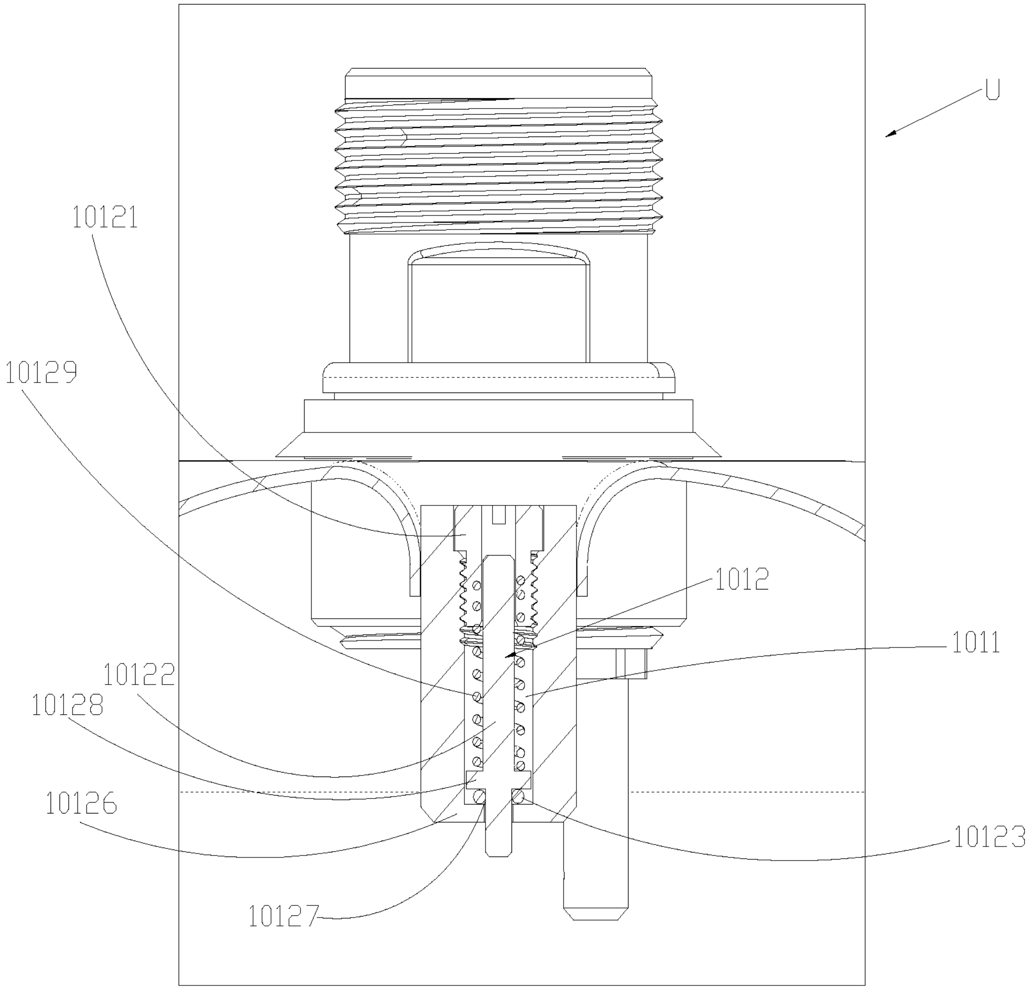
FIG. 9 is an enlarged view of U area of FIG. 7.
Figure 10:
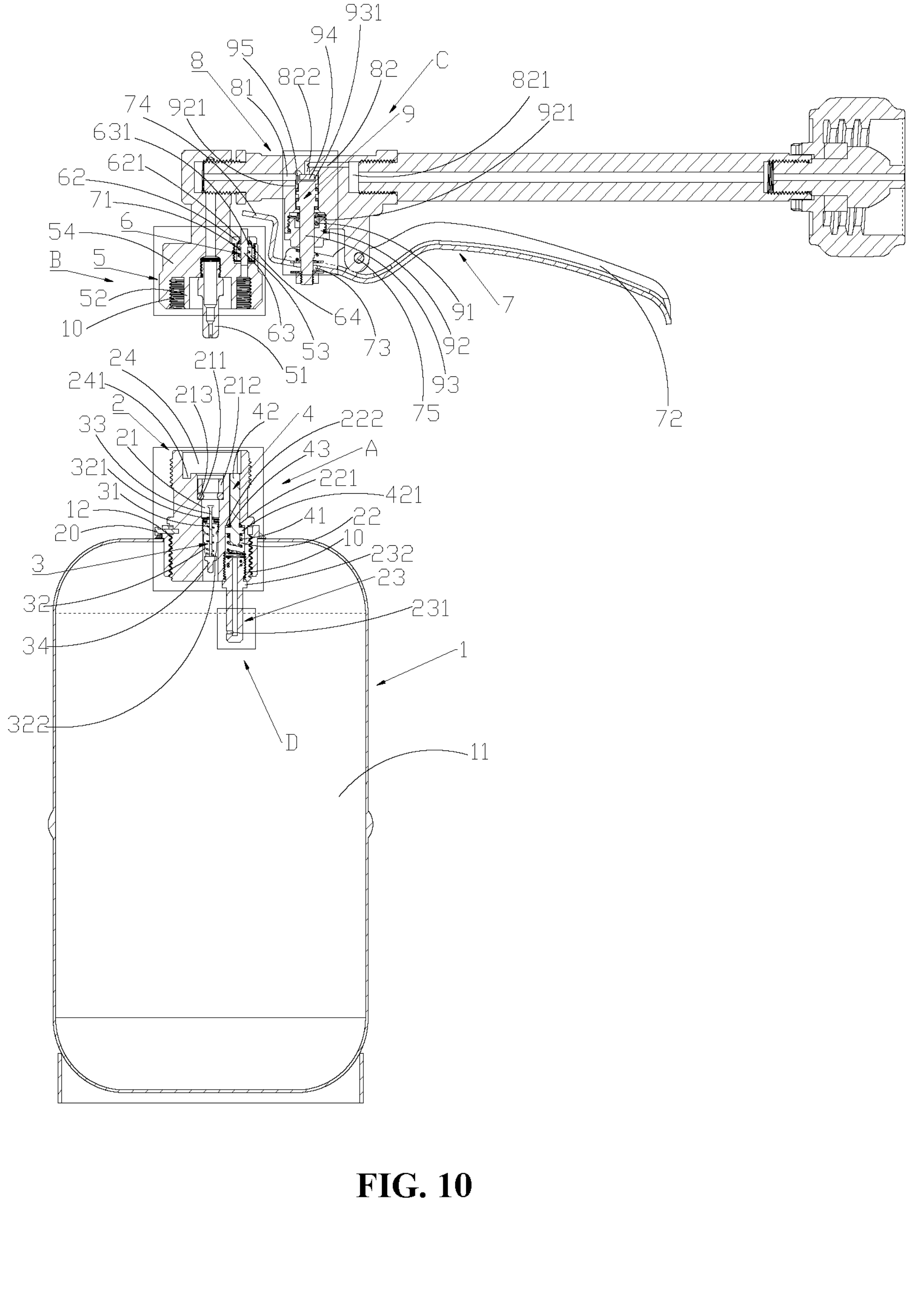
FIG. 10 is a cross-sectional view of the present invention.
Figure 11:
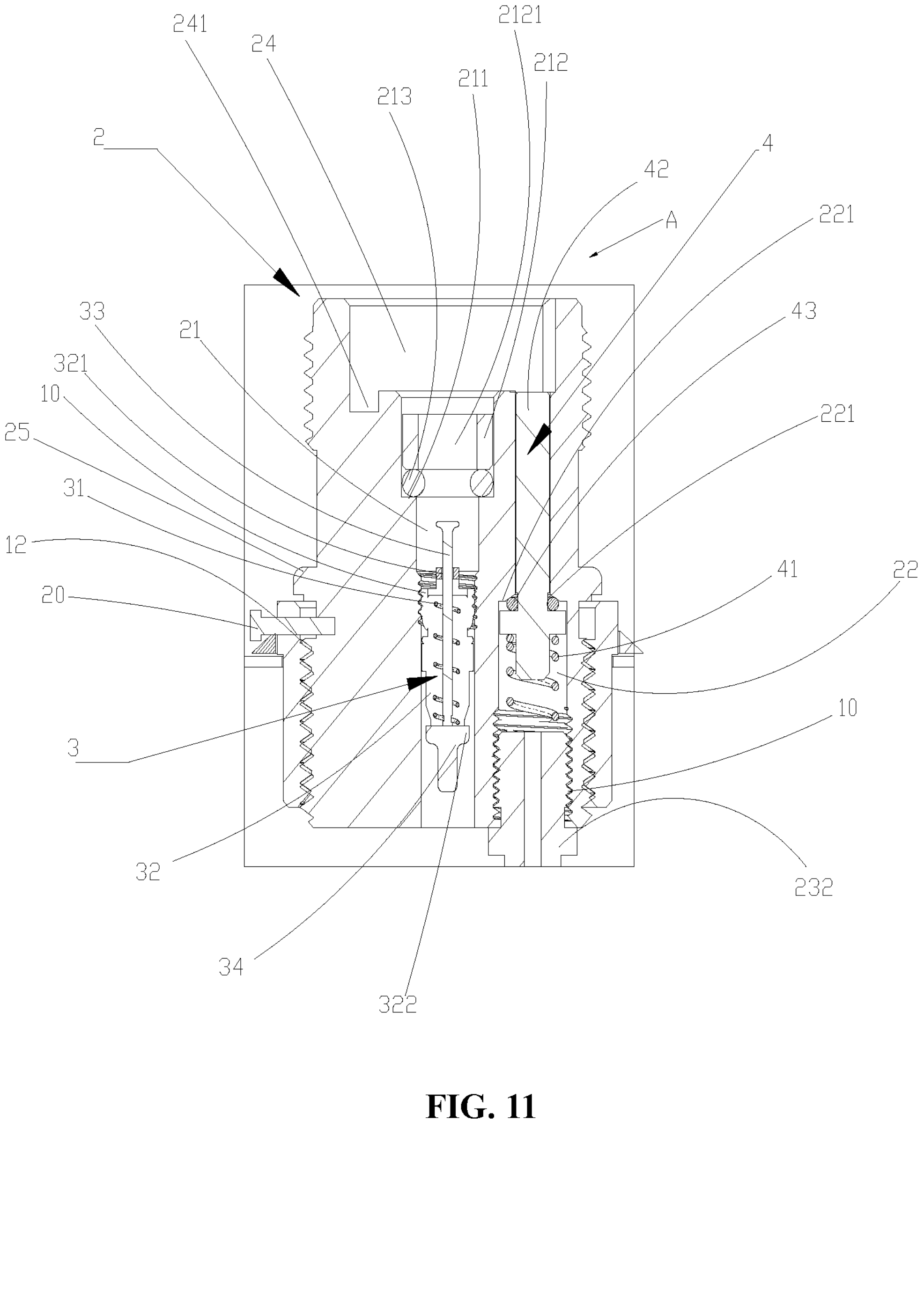
FIG. 11 is an enlarged view of A area of FIG. 10.
Figure 12:
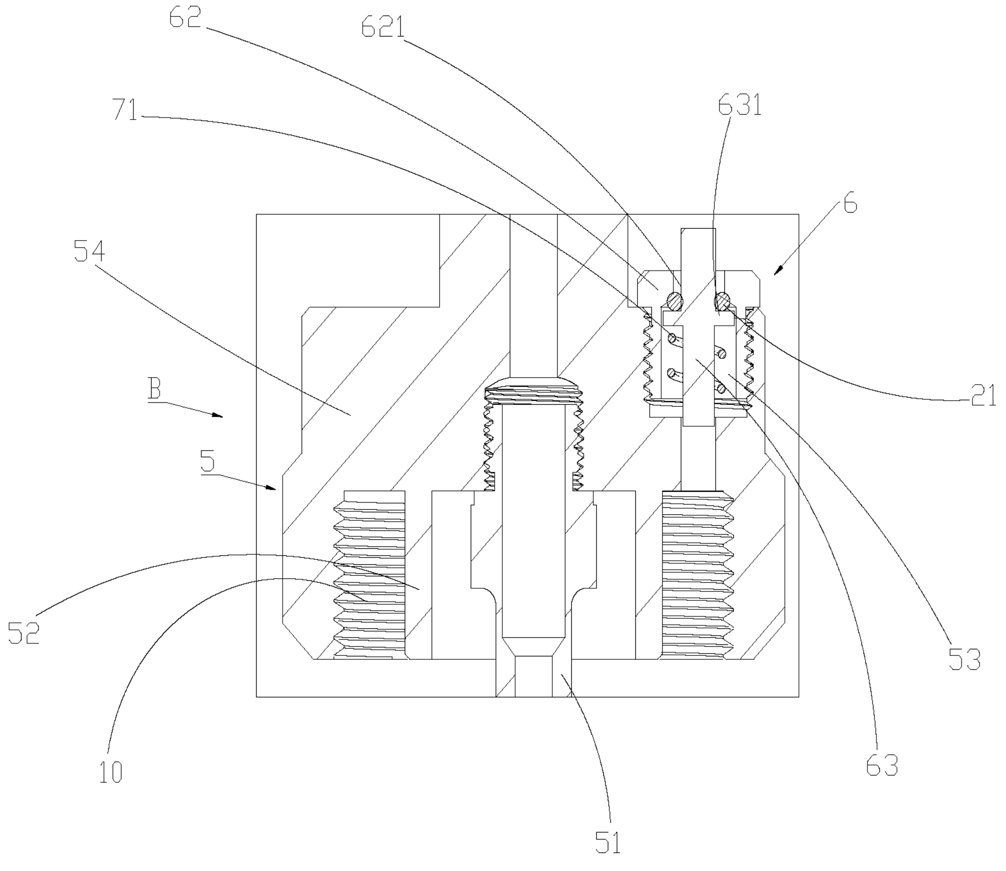
FIG. 12 is an enlarged view of B area of FIG. 10.
Figure 13:
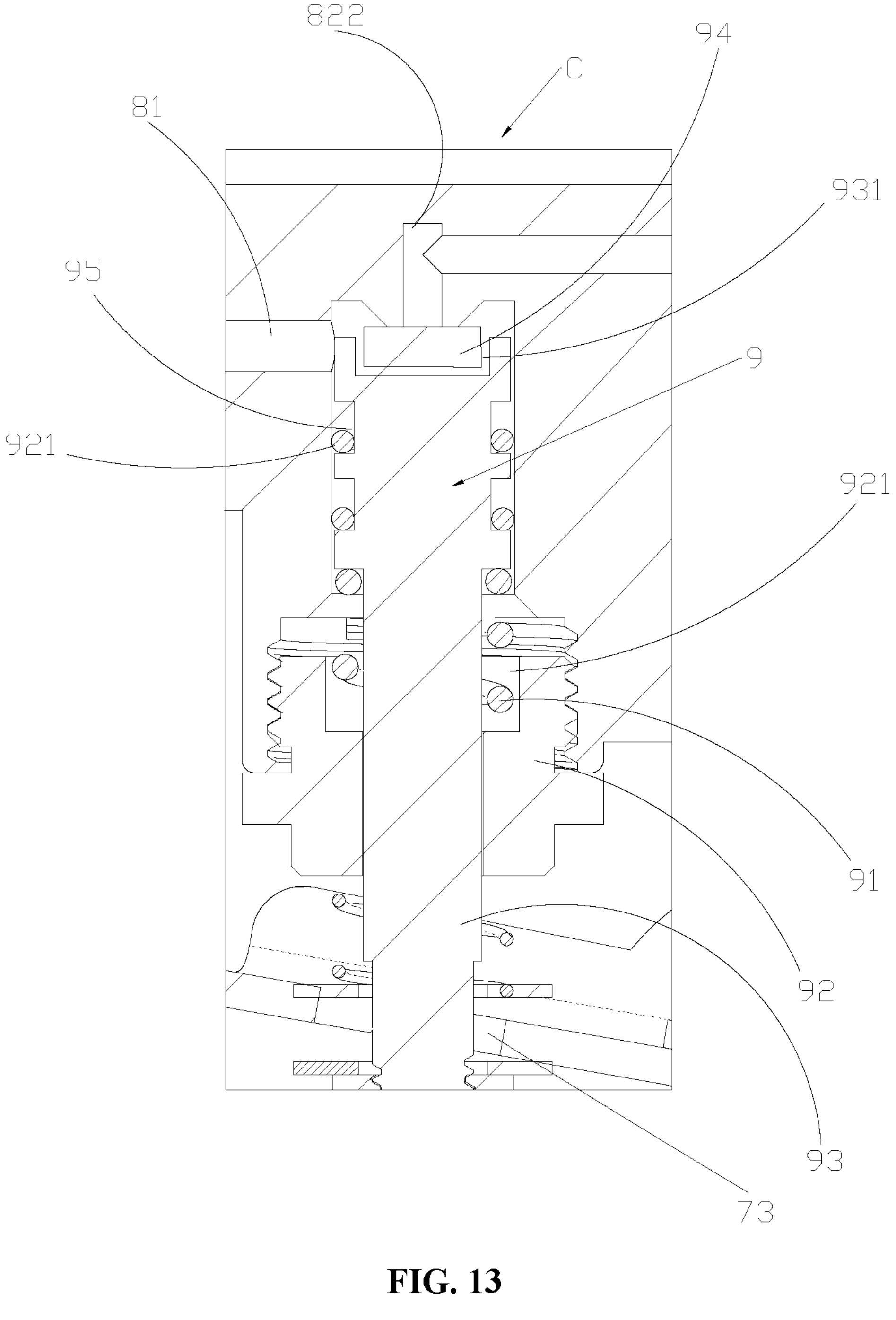
FIG. 13 is an enlarged view of C area of FIG. 10.
Figure 14:
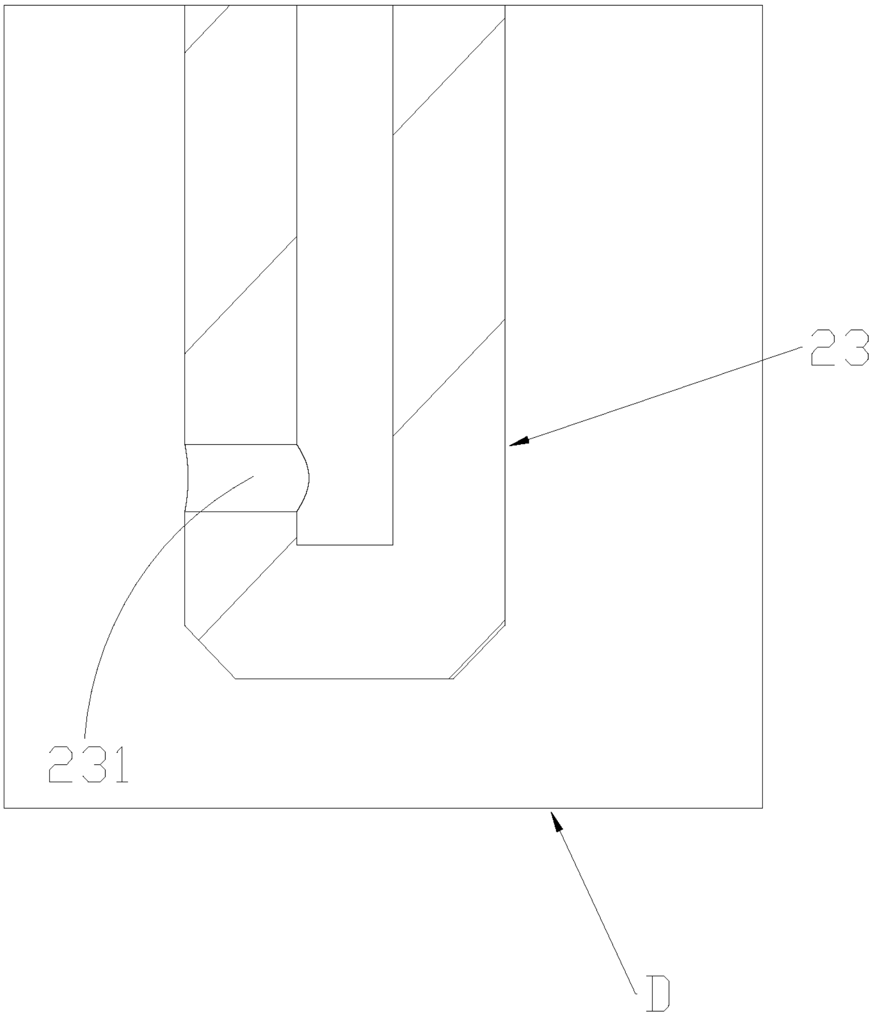
FIG. 14 is an enlarged view of D area of FIG. 10.
Figure 15:
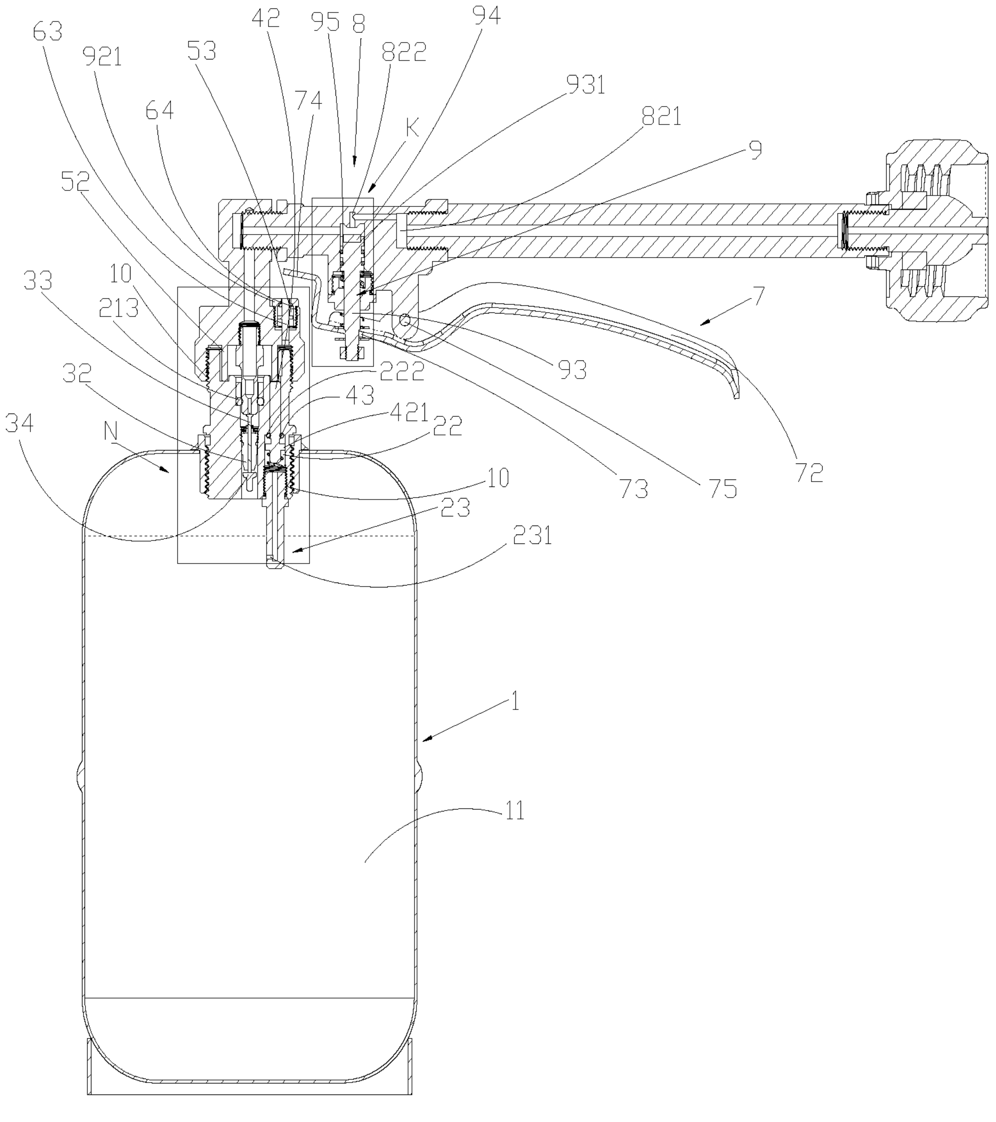
FIG. 15 is another cross-sectional view taken along the valve main body.
Figure 16:
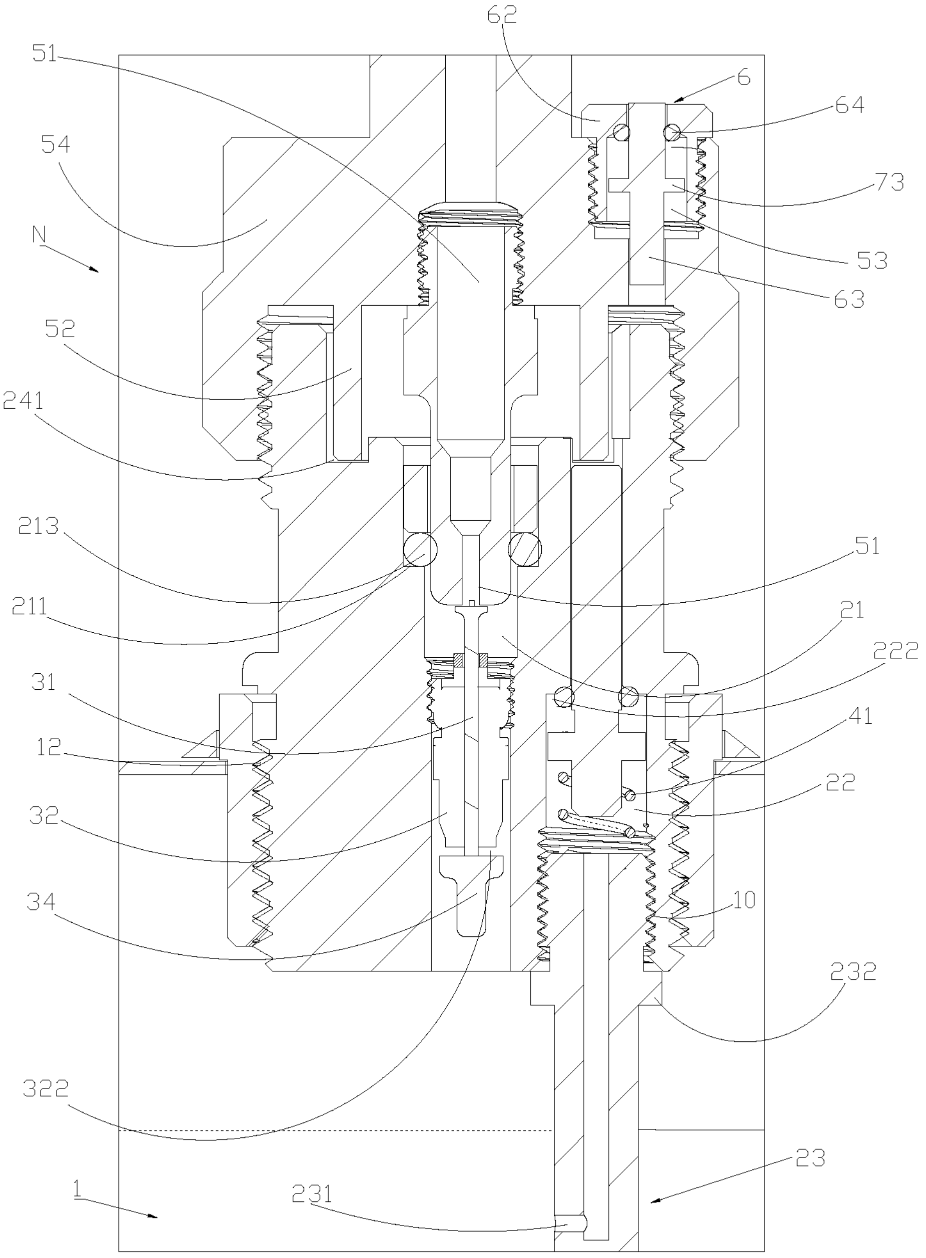
FIG. 16 is an enlarged view of N area of FIG. 15.
Figure 17:
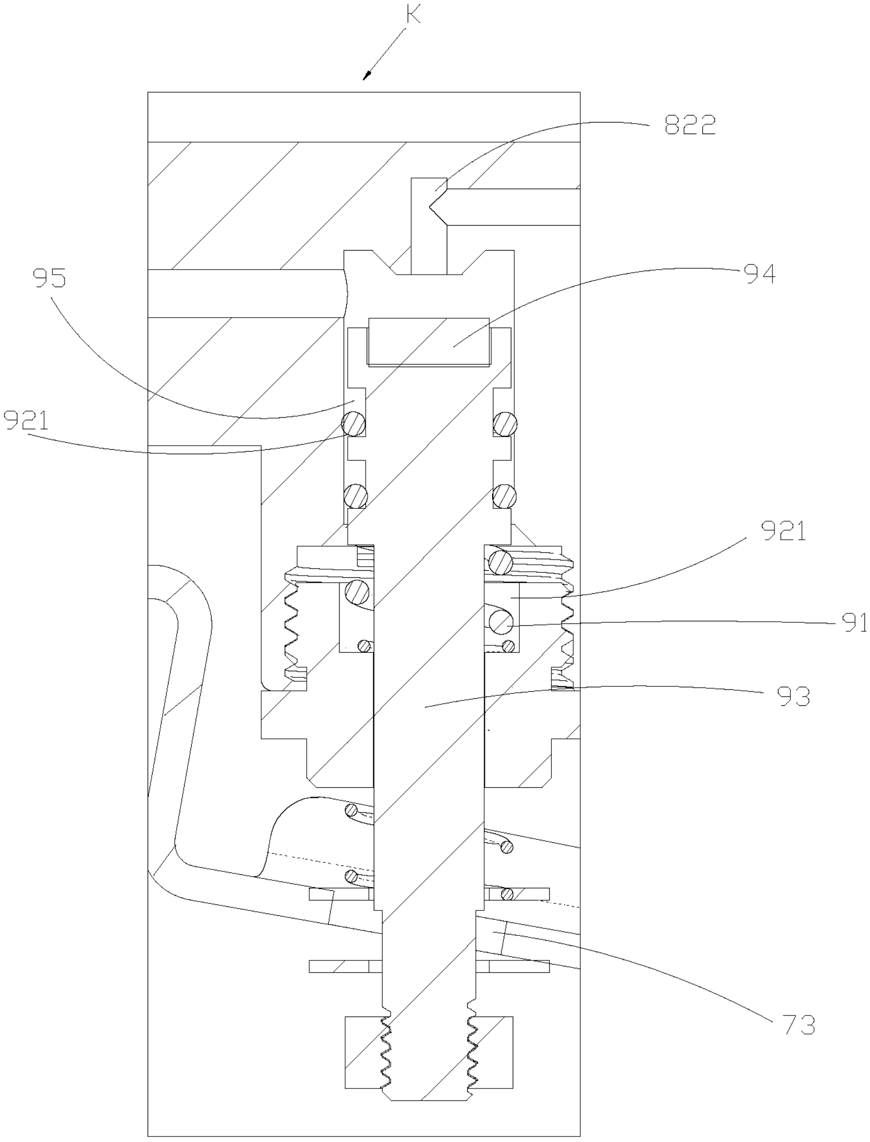
FIG. 17 is an enlarged view of K area of FIG. 15.

Referring to FIGS. 1-17, a refillable propane gas tank includes a propane tank body 1, a valve main body 2, a first sealing valve 3, a second sealing valve 4, and a liquid injecting head 5.

The propane tank body 1 includes an accommodating cavity 11 and a mounting opening 12. The accommodating cavity 11 is configured for accommodating propane.

The valve main body 2 is connected to an inner wall of the mounting opening 12. The valve main body 2 is provided with a liquid injecting channel 21 and a pressure relief channel 22. The liquid injecting channel 21 and the pressure relief channel 22 are both in communication with the accommodating cavity 11. The pressure relief channel 22 is provided with a first air outlet 221.

The first sealing valve 3 is configured for sealing the liquid injecting channel 21. The first sealing valve 3 is movable between a first open position and a first closed position. When the first sealing valve 3 is in the first open position, the first sealing valve 3 opens the liquid injecting channel 21; when the first sealing valve 3 is in the first closed position, the first sealing valve 3 seals the liquid injecting channel 21.

The second sealing valve 4 is configured for sealing the first air outlet 221. The second sealing valve 4 is movable between a second open position and a second closed position. When the second sealing valve 4 is in the second open position, the first air outlet 221 is opened; when the second sealing valve 4 is in the second closed position, the second sealing valve 4 seals the first air outlet 221.

The liquid injecting head 5 is detachably connected to the valve body 2. The liquid injecting head 5 is provided with a liquid injecting pipe 51, a top pressing structure 52 and an overflow port 53. When the liquid injecting head 5 is connected to the valve main body 2, the liquid injecting pipe 51 is configured for pushing the first sealing valve 3 to the first open position, so as to make the first sealing valve 3 open the liquid injecting channel 21, so that the liquid injecting pipe 51 is in communication with the liquid injecting channel 21. The top pressing structure 52 pushes the second sealing valve 4 to the second open position to make the second sealing valve 4 open the first air outlet 221, so that the first air outlet 221 is in communication with the overflow port 53.

Through the structure above, the refillable propane gas tank includes the propane tank body 1, the valve main body 2, the first sealing valve 3, the second sealing valve 4, and the liquid injecting head 5. The propane tank body 1 includes the accommodating cavity 11 and the mounting opening 12. The accommodating cavity 11 is configured for accommodating propane. The valve main body 2 is connected to the inner wall of the mounting opening 12. The valve body 2 is provided with the liquid injecting channel 21 and the pressure relief channel 22. The liquid injecting channel 21 and the pressure relief channel 22 are both in communication with the accommodating cavity 11. The pressure relief channel 22 is provided with the first air outlet 221. The first sealing valve 3 is configured for sealing the liquid injecting channel 21. The first sealing valve 3 is movable between the first open position and the first closed position. When the first sealing valve 3 is in the first open position, the first sealing valve 3 opens the liquid injecting channel 21; when the first sealing valve 3 is in the first closed position, the first sealing valve 3 seals the liquid injecting channel 21. The second sealing valve 4 is configured for sealing the first air outlet 221. The second sealing valve 4 is movable between the second open position and the second closed position. When the second sealing valve 4 is in the second open position, the first air outlet 221 is opened; when the second sealing valve 4 is in the second closed position, the second sealing valve 4 seals the first air outlet 221. The liquid injecting head 5 is detachably connected to the valve body 2. The liquid injecting head 5 is provided with the liquid injecting pipe 51, the top pressing structure 52 and the overflow port 53. When the liquid injecting head 5 is connected to the valve main body 2, the liquid injecting pipe 51 is configured for pushing the first sealing valve 3 to the first open position, so as to make the first sealing valve 3 open the liquid injecting channel 21, so that the liquid injecting pipe 51 is in communication with the liquid injecting channel 21. The top pressing structure 52 pushes the second sealing valve 4 to the second open position to make the second sealing valve 4 open the first air outlet 221, so that the first air outlet 221 is in communication with the overflow port 53. Therefore, the user can connect the liquid injecting head 5 with the valve main body 2 when the user needs to fill the propane tank body 1 with propane, to make the liquid injecting pipe 51 push the first sealing valve 3 to the first open position, so as to release the seal of the first sealing valve 3 on the liquid injecting channel 21. Thus the liquid injecting pipe 51 is in communication with the liquid injecting channel 21, facilitating liquid propane to be injected into the propane tank body 1 through the liquid injecting pipe 51 of the liquid injecting head 5. Moreover, the top pressing structure 52 pushes the second sealing valve 4 to the second open position to make the second sealing valve 4 open the first air outlet 221, so that the first air outlet 221 is in communication with the overflow port 53, facilitating the gas in the propane tank body 1 to be discharged through the first air outlet 221 and the overflow port 53. When the propane tank body 1 is filled, propane in the propane tank body 1 flows out through the first air outlet 221 and the overflow port 53, and the propane atomizes the instant it overflows the overflow port 53. The user can observe whether an atomization phenomenon occurs to determine whether the propane tank body 1 has been filled. After the propane tank body 1 is filled, the liquid injecting head 5 can be detached from the valve main body 2, the first sealing valve 3 returns to the first closed position and seals the liquid injecting channel 21; the second sealing valve returns to the second closed position and seals the first air outlet 221. So that the propane in the propane tank body is prevented from leaking through the liquid injecting channel 21 and the first air outlet 221. In addition, after the propane in the propane tank body 1 is depleted, the propane can be injected into the propane tank body 1 again through the liquid injecting pipe 51 and the liquid injecting channel 21, so that the propane tank body 1 can be reused.

In the present embodiment, the refillable propane gas tank further includes a first elastic reset member 31. The first elastic reset member 31 is configured for pushing the first sealing valve 3 to the first closed position. The refillable propane gas tank further includes a second elastic reset member 41. The second elastic reset member 41 is configured for pushing the second sealing valve 4 to the second closed position. Through the above structure, after the propane tank body 1 is filled, the liquid injecting head 5 can be detached from the valve main body 2, the first elastic reset device pushes the first sealing valve 3 back to the first closed position, and the first sealing valve 3 seals the liquid injecting channel 21; the second elastic reset device pushes the second sealing valve 4 back to the second closed position, and the second sealing valve 4 seals the first air outlet 221. So that the propane in the propane tank body 1 is prevented from leaking through the liquid injecting channel 21 and the first air outlet 221.

In this embodiment, the refillable propane gas tank further includes a third sealing valve 6. The third sealing valve 6 is configured for sealing the overflow port 53. The third sealing valve 6 is movable between a third open position and a third closed position. When the third sealing valve 6 is in the third open position, the third sealing valve 6 opens the overflow port 53; and when the third sealing valve 6 is in the third closed position, the third sealing valve 6 seals the overflow port 53. Herein, the refillable propane gas tank includes a trigger device 7. The trigger device 7 is connected to the liquid injecting head 5. The trigger device 7 is movable between a trigger position and a non-trigger position. When the trigger device 7 moves to the trigger position, the trigger device 7 is configured for pushing the third sealing valve 6 to the third open position to make the third sealing valve 6 open the overflow port 53. Specifically, the refillable propane gas tank further includes a third elastic reset member 71. When the trigger device 7 moves to the non-trigger position, the third elastic reset member 71 is configured for pushing the third sealing valve 6 to the third closed position. Through the described structure above, when the propane is injected into the propane tank body 1, the trigger device 7 can be moved to the trigger position to open the overflow port 53, so that the first air outlet 221 is in communication with the overflow port 53, facilitating the gas in the propane tank body 1 to be discharged through the first air outlet 221 and the overflow port 53. When the propane tank body 1 is filled, the trigger device 7 can be moved to the non-trigger position to make the third elastic reset member 71 to push the third sealing valve 6 to the third closed position.

In this embodiment, a top end of the first sealing valve 3 and a top end of the second sealing valve 4 are both lower than a top end of the valve main body 2. Through the structure above, the first sealing valve 3 and the second sealing valve 4 of the propane tank body 1 can be protected and prevented from being opened during transportation and storage, greatly improving the safety of the propane tank body 1.

In the present embodiment, the valve main body 2 is connected to the mounting opening 12 via threads 10. The valve main body 2 and the mounting opening 12 are fixedly connected via an adhesive or a bolt. Through the structure above, the valve main body 2 connected to the mounting opening 12 through the threads 10 effectively achieves the connection of the valve main body 2. Moreover, the valve main body 2 and the mounting opening 12 are fixedly connected through the adhesive or bolt in a secondary connection, further reinforcing the connection between the valve main body 2 and the propane tank body 1, preventing the valve body 2 from disengaging from the propane tank body 1, and further improving the security of the propane tank body 1.

In the present embodiment, the liquid injecting head 5 further includes a conveying pipe 8. The conveying pipe 8 is in communication with the liquid injecting pipe 51. The refillable propane gas tank further includes a fourth sealing valve 9. The fourth sealing valve 9 is configured for sealing the conveying pipe 8. The fourth sealing valve 9 is movable between a fourth open position and a fourth closed position. When the fourth sealing valve 9 is in the fourth open position, the fourth sealing valve 9 opens the conveying pipe 8, so that the conveying pipe 8 is in communication with the liquid injecting pipe 51; when the fourth sealing valve 9 is in the fourth closed position, the fourth sealing valve 9 seals the conveying pipe 8, so that the conveying pipe 8 is not in communication with the liquid injecting pipe 51. When the trigger device 7 moves to the trigger position, the trigger device 7 is configured for pulling the fourth sealing valve 9 to the fourth open position, to make the fourth sealing valve 9 open the conveying pipe 8, so that the conveying pipe 8 is in communication with the liquid injecting pipe 51. Herein, the refillable propane gas tank further includes a fourth elastic rest member 91. The fourth elastic reset member 91 is configured for pushing the fourth sealing valve 9 to the fourth closed position when the trigger device 7 is moved to the non-trigger position. Through the structure above, when the propane is injected into the propane tank body 1, the trigger device 7 can be moved to the trigger position to open the conveying pipe 8, facilitating gas source connected to the conveying pipe 8 to be injected into the propane tank body 1 through the conveying pipe 8, the liquid injecting pipe 51 and the liquid injecting channel 21. When the propane tank body 1 is filled, the trigger device 7 can be moved to the non-trigger position, so that the fourth elastic reset member 91 is configured for pushing the fourth sealing valve 9 to the fourth closed position to make the fourth sealing valve 9 seal the conveying pipe 8. Thus the conveying pipe 8 is not in communication with the liquid injecting pipe 51, stopping injecting the propane into the propane tank body 1. The design is reasonable. The real-time charging and stopping is achieved through the trigger device 7, so that an amount of propane injected into the propane tank body 1 can be accurately regulated. And the propane charging can be stopped immediately upon reaching a full state, preventing excessive propane from overflowing from the overflow port 53, greatly avoiding the waste of propane, and saving energy.

In the present embodiment, the refillable propane gas tank further includes a first extension pipe 23. The first extension pipe 23 is connected to and communicated with the pressure relief channel 22. A side wall of the first extension pipe 23 is provided with a second air outlet 231. The second air outlet 231 is in communication with the pressure relief channel 22. Herein the first extension pipe 23 and the inner wall of the pressure relief channel 22 are detachably connected. Through the described structure above, compared with the second air outlet 231 at an end of the first extension pipe 23, arranging the second air outlet 231 on the side wall of the first extension pipe 23 can prevent the propane filled in the propane tank body 1 from splashing to the second air outlet 231 and overflowing from the pressure relief channel 22 and the overflow port 53 and atomizing—thus avoiding interference with the user's judgment on whether the propane tank body 1 is full. Only when the liquid level of the propane in the propane tank body 1 reaches the position of the second air outlet 231, the propane in the propane tank body 1 enters the second air outlet 231 and overflows from the pressure relief channel 22 and the overflow port 53 and atomizes. Upon observing the atomization, the user knows that the propane tank body 1 has been filled.

In the present embodiment, the first sealing valve 3 includes a first valve housing 32, a first valve core 33 and a first elastic sealing portion 34. The first valve housing 32 is provide with a first mounting channel 321 and a first liquid injecting port 322. The first valve core 33 can move between the first open position or the first closed position in the first mounting channel 321. The first elastic sealing portion 34 is connected to the first valve core 33, and the first elastic sealing portion 34 is configured for sealing the first liquid injecting port 322. When the first valve core 33 is moved to the first closed position, the first elastic reset member 31 is configured for pulling the first elastic sealing portion 34 to an end of the first liquid injecting port 322. When the liquid injecting head 5 is connected to the valve main body 2, the liquid injecting pipe 51 is configured for pushing the first valve core 33 to the first open position so as to make the first elastic sealing portion 34 open the first liquid injecting port 322, so that the liquid injecting pipe 51 is in communication with the liquid injecting channel 21. The first valve housing 32 is detachably connected to an inner wall of the liquid injecting channel 21. Specifically, the first valve housing 32 and the inner wall of the liquid injecting channel 21 are detachably connected via the threads 10. Through the described structure above, the arrangement of the first sealing valve 3 is effectively achieved. When the liquid injecting head 5 is connected to the valve main body 2, and propane is injected into the propane tank body 1, the liquid injecting pipe 51 is configured for pushing the first valve core 33 to the first open position to make the first elastic sealing portion 34 open the first liquid injecting port 322, so that the liquid injecting pipe 51 is in communication with the liquid injecting channel 21, so as to inject propane through the liquid injecting pipe 51, the liquid injecting channel 21 and the first liquid injecting port 322 into the propane tank body 1. When the propane tank body 1 is filled, the liquid injecting head 5 can be detached from the valve main body 2, and the first elastic reset member 31 is configured for pulling the first elastic sealing portion 34 to fit an end of the first liquid injecting port 322 to seal the first liquid injecting port 322 to prevent the propane in the propane tank body 1 from overflowing through the first liquid injecting port 322. When the propane tank body 1 is required for use, a gas pipe of an appliance can be inserted into the liquid injecting channel 21, and the gas pipe is caused to push the first valve core 33 to the first open position, so as to release the seal of the first elastic sealing portion 34 to the first liquid injecting port 322, so that the gas pipe is in communication with the liquid injecting channel 21, so that the propane in the propane tank body 1 is conveyed to the appliance via the gas pipe. The appliance can be a flame spray gun or a gas stove and other appliances.

In the present embodiment, a first stop inner wall 222 is provided in the pressure relief channel 22. The second sealing valve 4 includes a first pushing rod 42 and a second elastic sealing portion 43. The first pushing rod 42 is positioned in the pressure relief channel 22, and the first pushing rod 42 is provided with a first stop protrusion 421. The second elastic sealing portion 43 is provided between the first stop inner wall 222 and the first stop protrusion 421. The first pushing rod 42 is movable between the second open position and the second closed position. When the first pushing rod 42 moves to the second closed position, the first stop protrusion 421 and the first stop inner wall 222 are configured for compressing the second elastic sealing portion 43, so that the first stop protrusion 421 and the second elastic sealing portion 43 compress and seal the pressure relief channel 22. A first end of the second elastic reset member 41 abuts against the first extension pipe 23, a second end of the second elastic reset member 41 abuts against the first stop protrusion 421. The second elastic reset member 41 is configured for pushing the first pushing rod 42 to the second closed position. The top pressing structure 52 pushes the first pushing rod 42 to the second open position, to release the compression exerted by the first stop protrusion 421 and the first stop inner wall 222 on the second elastic sealing portion 43 to make the second sealing valve 4 open the first air outlet 221, so that the first air outlet 221 is in communication with the overflow port 53. Through the structure above, the arrangement of the second sealing valve 4 is effectively realized. When the liquid injecting head 5 is connected to the valve main body 2, the top pressing structure 52 of the liquid injecting head 5 is configured for pushing the second pushing rod 63 to the second open position, to release the compression exerted by the first stop protrusion 421 and the first stop inner wall 222 on the second elastic sealing portion 43 to make the second sealing valve 4 open the first air outlet 221, so that the first air outlet 221 is in communication with the overflow port 53. When the liquid injecting head 5 is detached from the valve main body 2, the second elastic reset member 41 is configured for pushing the first pushing rod 42 to the second closed position, so that the first stop protrusion 421 and the first stop inner wall 222 compress the second elastic sealing portion 43 to seal and cover the pressure relief channel 22.

In the present embodiment, the third sealing valve 6 includes a second valve housing 62, a second pushing rod 63, a third elastic sealing portion 64. The second valve housing 62 is connected to an inner wall of the overflow port 53. The second valve housing 62 is provided with a third air outlet 621. The third air outlet 621 is in communication with the overflow port 53. The second pushing rod 63 is positioned in the third air outlet 621, and the second pushing rod 63 is movable between the third open position or the third closed position. The second pushing rod 63 is provided with a second stop protrusion 631. The third elastic sealing portion 64 is positioned between the second stop protrusion 631 and an inner wall of the third air outlet 621. When the second pushing rod 63 moves to the third closed position, the second stop protrusion 631 presses the third elastic sealing portion 64 between the inner wall of the third air outlet 621, so that the second stop protrusion 631 seals and covers the third air outlet 621. When the trigger device 7 pushes the second pushing rod 63 to the third open position, the second stop protrusion 631 and the second elastic sealing portion 43 open the third air outlet 621. Through the structure above, the arrangement of the third sealing valve 6 is effectively achieved. The second pushing rod 63 can be pushed by the trigger device 7 to the third open position to make the second stop protrusion 631 and the second elastic sealing portion 43 open the third air outlet 621, so as to discharge the gas in the propane tank body 1 through the pressure relief channel 22, the overflow port 53 and the third air outlet 621 during the process of filling propane into the propane tank body 1. After the propane tank body 1 is filled, move the trigger device 7 to the non-trigger position, and the third elastic reset member 71 pushes the second pushing rod 63 to the third closed position, and the second stop protrusion 631 presses the third elastic sealing portion 64 between the inner wall of the third air outlet 621, so that the second stop protrusion 631 seals and covers the third air outlet 621.

In the present embodiment, the conveying pipe 8 includes a first channel 81 and a second channel 82. A first end of the second channel 82 is provided with an inlet 821, and a second end of the second channel 82 is provided with an outlet 822. The inlet 821, the second channel 82, the outlet 822, the first channel 81, and a liquid injecting pipe 51 are communicated in sequence. The fourth sealing valve 9 includes a third valve housing 92, a third pushing rod 93, a fourth elastic sealing portion 94. The liquid injecting head and the third valve housing 92 both include a second mounting channel 921. The third pushing rod 93 is movable between the fourth open position and the fourth closed position in the second mounting channel 921. When the trigger device 7 is moved to the non-trigger position, the fourth elastic reset member 91 is configured for pushing the third pushing rod 93 to the fourth closed position to make the fourth elastic sealing portion 94 seal and cover the outlet 822, thus the second channel 82 is not in communication with the first channel 81 and the liquid injecting pipe 51. When the trigger device 7 is moved to the trigger position, the trigger device 7 is configured for pulling the third pushing rod 93 to the fourth open position to make the fourth elastic sealing portion 94 open the outlet 822, so that the second channel 82 is in communication with the first channel 81 and the liquid injecting pipe 51. The fourth sealing valve 9 further includes a fifth elastic sealing portion 95. The fifth elastic sealing portion 95 is sleeved on the third pushing rod 93. The fifth elastic sealing portion 95 is positioned between the third pushing rod 93 and an inner wall of the second mounting channel 921, and the fifth elastic sealing portion 95 is configured for sealing a gap between the third pushing rod 93 and the inner wall of the second mounting channel 921. An end of the third pushing rod 93 is provided with a first mounting slot 931. The fourth elastic sealing portion 94 is positioned in the first mounting slot 931. Through the above structure, the third pushing rod 93 can be pulled by the trigger device 7 to move between the fourth open position and the fourth closed position to drive the fourth elastic sealing portion 94 to open or seal the outlet 822. Herein the fifth elastic sealing portion 95 can seal the gap between the third pushing rod 93 and the inner wall of the second mounting channel 921 to prevent leakage of propane from the gap between the third pushing rod 93 and the inner wall of the second mounting channel 921, preventing the propane from leaking through the gap between the third pushing rod 93 and the inner wall of the second mounting channel 921.

In the present embodiment, the trigger device 7 is a trigger lever, and the trigger lever includes a first operating portion 72, a first pulling portion 73, a first pressing portion 74. The first operating portion 72, the first pulling portion 73, and the first pressing portion 74 are connected in sequence. The first pulling portion 73 is connected to the third pushing rod 93. The trigger lever further includes a rotating portion 75. The rotating portion 75 is positioned between the first pressing portion 74 and the first pulling portion 73. The rotating portion 75 is rotatably connected to the liquid injecting head 5, so that the trigger lever can rotate between the trigger position and the non-trigger position. When the first operating portion 72 of the trigger lever rotates to the trigger position, the first pulling portion 73 is configured for pulling the third pushing rod 93 to the fourth open position to make the fourth elastic sealing portion 94 open the outlet 822, so that the second channel 82 is in communication with the first channel 81 and the liquid injecting pipe 51. The first pressing portion 74 pushes the second pushing rod 63 to the third open position so as to make the second stop protrusion 631 and the second elastic sealing portion 43 open the third air outlet 621. Through the above structure, when the first operating portion 72 of the trigger lever rotates to the trigger position, the first pulling portion 73 is configured for pulling the third pushing rod 93 to the fourth open position, so as to make the fourth elastic sealing portion 94 open the outlet 822, so that the second channel 82 is in communication with the first channel 81 and the liquid injecting pipe 51. The first pressing portion 74 pushes the second pushing rod 63 to the third open position, so as to make the second stop protrusion 631 and the second elastic sealing portion 43 open the third air outlet 621. The third air outlet 621 and the outlet 822 can be synchronously opened through the trigger lever, facilitating the user to quickly inject the propane into the propane tank body 1. The operation is simple and convenient. After the propane tank body 1 is filled, the trigger device 7 moves to the non-trigger position, the third elastic reset member 71 is configured for pushing the third sealing valve 6 to the third closed position, and the fourth elastic reset member 91 is configured for pushing the fourth sealing valve 9 to the fourth closed position, so that the outlet 822 and the third air outlet 621 are synchronously sealed. Moreover, the fourth elastic reset member 91 can drive the trigger device 7 to reset to the non-trigger position during the reset process.

In the present embodiment, the valve main body 2 includes an accommodating groove 24. A bottom wall of the accommodating groove 24 is recessed to form a limiting annular groove 241. A top end of the second sealing valve 4 is positioned in the limiting annular groove 241. The top pressing structure 52 is a convex annular top pressing structure 52. The annular top pressing structure 52 is positioned in the limiting annular groove 241. Through the structure above, the annular top pressing structure 52 can rotate in the limiting annular groove 241. The annular top pressing structure 52 can rotate to any position to push the second sealing valve 4 to open, so that the user can conveniently mount the liquid injecting head 5 and the valve main body 2 together without deliberately focusing on whether the top pressing structure 52 is aligned with the top end of the second sealing valve 4.

In the present embodiment, the liquid injecting channel 21 includes a second stop inner wall 211 and an annular guiding portion 212. The guiding portion 212 is provided in the liquid injecting channel 21. The guiding portion 212 is provided with a first opening 2121. The first opening 2121 is in communication with the liquid injecting channel 21. An elastic sealing ring 213 is provided between the guiding portion 212 and the second stop inner wall 211. The liquid injecting pipe 51 can abut against the first sealing valve 3 through the first opening 2121 and the elastic sealing ring 213. Through the above structure, the guiding portion 212 facilitating the liquid injecting pipe 51 to be guided into the liquid injecting channel 21 and to be aligned with the first sealing valve 3, so that the liquid injecting pipe 51 can accurately push and open the first sealing valve 3.

In the present embodiment, the first extension pipe 23 is provided with a third stop protrusion 232, and the third stop protrusion 232 abuts against an end of the pressure relief channel 22. The above structure facilitates the user to install the first extension pipe 23.

In the present embodiment, the liquid injecting head 5 is detachably connected to the valve main body 2 through the threads 10. The liquid injecting head 5 includes a main housing 54. The liquid injecting pipe 51 is detachably connected to the main housing 54. Specifically, the liquid injecting pipe 51 is detachably connected to the main housing 54 via the threads 10. Further, the valve main body 2 includes a fourth stop protrusion 25, and the fourth stop protrusion 25 abuts against an end of the mounting opening 12. Further, the first extension pipe 23 and the inner wall of the pressure relief channel 22 are detachably connected via the threads 10.

In the present embodiment, the propane tank body 1 further includes a third mounting channel 1011. The third mounting channel is internally provided with an over pressure protective valve 1012. When the air pressure in the propane is too large, the over pressure protective valve 1012 will be opened by the gas in the propane tank body 1, allowing the gas in the propane tank body 1 to overflow through the over pressure protective valve 1012, and preventing the propane tank body 1 from explosion due to excessive internal air pressure.

Herein the over pressure protective valve 1012 includes a fourth valve housing 10121, a fourth pushing rod 10122 and a sixth elastic sealing portion 10123. The fourth valve housing 10121 is provided with a fourth mounting channel 10125, and the fourth pushing rod 10122 is movable between a fifth open position and a fifth closed position in the fourth mounting channel. The second mounting channel includes a mounting bottom wall 10126. The mounting bottom wall includes a gas channel 10127. The fourth pushing rod includes a sealing protrusion 10128. The sixth elastic sealing portion 10123 is positioned between the sealing protrusion 10128 and the mounting bottom wall 10126. The refillable propane gas tank further includes a fifth elastic reset member 10129. A first end of the fifth elastic reset member 10129 abuts against the fourth valve housing 10121, and a second end of the fifth elastic reset member 10129 abuts against the sealing protrusion 10128, so that the fifth elastic reset member 10129 presses the sealing protrusion 10128 and the sixth elastic sealing portion 10123 to the mounting bottom wall 10126 to cover the gas channel 10127.

In this embodiment, the first elastic sealing portion 34, the second elastic sealing portion 43, the third elastic sealing portion 64, the fourth elastic sealing portion 94, the fifth elastic sealing portion 95, and the sixth elastic sealing portion 10123 are all silicone elastic sealing portions. The elastic sealing ring 213 is a silicone elastic sealing ring. The first elastic reset member 31, the second elastic reset member 41, the third elastic reset member 71, the fourth elastic reset member 91, and the fifth elastic reset member 10129 are all springs.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A refillable propane gas tank, comprising:

a propane tank body, the propane tank body comprising an accommodating cavity and a mounting opening, the accommodating cavity being configured for accommodating propane;

a valve main body, the valve main body being connected to an inner wall of the mounting opening; the valve main body being provided with a liquid injecting channel and a pressure relief channel, the liquid injecting channel and the pressure relief channel being both in communication with the accommodating cavity; the pressure relief channel being provided with a first air outlet;

a first sealing valve, wherein the first sealing valve is configured for sealing a liquid injecting channel, and the first sealing valve is movable between a first open position and a first closed position; when the first sealing valve is positioned at the first open position, the first sealing valve is configured for opening the liquid injecting channel; when the first sealing valve is positioned at the first closed position, the first sealing valve is configured for sealing the liquid injecting channel;

a second sealing valve, wherein the second sealing valve is configured for sealing the first air outlet; the second sealing valve is movable between a second open position and a second closed position; when the second sealing valve is positioned at the second open position, the first air outlet is opened; when the second sealing valve is positioned at the second closed position, the second sealing valve seals the first air outlet;

a liquid injecting head, the liquid injecting head being detachably connected to the valve main body; wherein the liquid injecting head is provided with a liquid injecting pipe, a top pressing structure and an overflow port; when the liquid injecting head is connected to the valve main body, the liquid injecting pipe is configured for pushing the first sealing valve to the first open position to make the first sealing valve open the liquid injecting channel, so that the liquid injecting pipe is in communication with the liquid injecting channel; the top pressing structure is configured for pushing the second sealing valve to the second open position, so as to make the second sealing valve open the first air outlet, so that the first air outlet is in communication with the overflow port.

2. The refillable propane gas tank according to claim 1, further comprising a first elastic reset member, the first elastic reset member being configured for pushing and resetting the first sealing valve to the first closed position; and the refillable propane gas tank further comprising a second elastic reset member, the second elastic reset member being configured for pushing and resetting the second sealing valve to the second closed position.

3. The refillable propane gas tank according to claim 2, wherein the first sealing valve comprises a first valve housing, a first valve core and a first elastic sealing portion, the first valve housing is provided with a first mounting channel and a first liquid injecting port, and the first valve core is movable between the first open position or the first closed position in the first mounting channel; the first elastic sealing portion is connected to the first valve core, and the first elastic sealing portion is configured for sealing the first liquid injecting port; when the first valve core moves to the first closed position, and the first elastic reset member is configured for pulling the first elastic sealing portion to fit an end of the first liquid injecting port; when the liquid injecting head is connected to the valve main body, the liquid injecting pipe is configured for pushing the first valve core to the first open position, so as to make the first elastic sealing portion open the first liquid injecting port, so that the liquid injecting pipe is in communication with the liquid injecting channel.

4. The refillable propane gas tank according to claim 3, wherein the first valve housing is detachably connected to an inner wall of the liquid injecting channel.

5. The refillable propane gas tank according to claim 2, wherein a first stop inner wall is provided in the pressure relief channel, the second sealing valve comprises a first pushing rod and a second elastic sealing portion, the first pushing rod is positioned in the pressure relief channel, the first pushing rod is provided with a first stop protrusion, the second elastic sealing portion is arranged between the first stop inner wall and the first stop protrusion, the first pushing rod is movable between the second open position and the second closed position, and when the first pushing rod moves to the second closed position, the first stop protrusion and the first stop inner wall are configured for compressing the second elastic sealing portion, so that the first stop protrusion and the second elastic sealing portion compress and seal the pressure relief channel; a first end of the second elastic reset member abuts against a first extension pipe, a second end of the second elastic reset member abuts against the first stop protrusion, and the second elastic reset member is configured for pushing the first pushing rod to the second closed position; the top pressing structure is configured for pushing the first pushing rod to the second open position, thereby releasing the compression exerted by the first stop protrusion and the first stop inner wall on the second elastic sealing portion and making the second sealing valve open the first air outlet, so that the first air outlet is in communication with the overflow port.

6. The refillable propane gas tank according to claim 1, wherein the refillable propane gas tank further comprises a third sealing valve, the third sealing valve is configured for sealing the overflow port; the third sealing valve is movable between a third open position and a third closed position; when the third sealing valve is positioned at the third open position, the third sealing valve is configured for opening the overflow port; and when the third sealing valve is positioned at the third closed position, the third sealing valve is configured for sealing the overflow port.

7. The refillable propane gas tank according to claim 6, further comprising a trigger device, wherein the trigger device is connected to the liquid injecting head, the trigger device is movable between a trigger position and a non-trigger position, and when the trigger device moves to the trigger position, the trigger device is configured for pushing the third sealing valve to the third open position, so as to make the third sealing valve open the overflow port.

8. The refillable propane gas tank according to claim 7, further comprising a third elastic reset member, wherein when the trigger device moves to the non-trigger position, the third elastic reset member is configured for pushing the third sealing valve to the third closed position.

9. The refillable propane gas tank according to claim 7, wherein the liquid injecting head further comprises a conveying pipe, and the conveying pipe is in communication with the liquid injecting pipe; the refillable propane gas tank further comprises a fourth sealing valve for sealing the conveying pipe, the fourth sealing valve is movable between a fourth open position and a fourth closed position; when the fourth sealing valve is positioned at the fourth open position, the fourth sealing valve is configured for opening the conveying pipe, so that the conveying pipe is in communication with the liquid injecting pipe; when the fourth sealing valve is positioned at the fourth closed position, the fourth sealing valve is configured for sealing the conveying pipe, so that the conveying pipe is not in communication with the liquid injecting pipe; when the trigger device moves to the trigger position, the trigger device is configured for pulling the fourth sealing valve to the fourth open position, so as to make the fourth sealing valve open the conveying pipe, so that the conveying pipe is in communication with the liquid injecting pipe.

10. The refillable propane gas tank according to claim 9, further comprising a fourth elastic reset member, wherein when the trigger device moves to the non-trigger position, the fourth elastic reset member is configured for pushing the fourth sealing valve to the fourth closed position.

11. The refillable propane gas tank according to claim 10, wherein the third sealing valve comprises a second valve housing, a second pushing rod, and a third elastic sealing portion, the second valve housing is connected to an inner wall of the overflow port, the second valve housing comprises a third air outlet, the third air outlet is in communication with the overflow port, the second pushing rod is positioned in the third air outlet, and the second pushing rod is movable between a third open position and a third closed position; the second pushing rod comprises a second stop protrusion, the third elastic sealing portion is positioned between the second stop protrusion and an inner wall of the third air outlet, and when the second pushing rod moves to the third closed position, the second stop protrusion is configured for compressing the third elastic sealing portion between the inner wall of the third air outlet, so that the second stop protrusion seals and covers the third air outlet; when the trigger device pushes the second pushing rod to the third open position, the second stop protrusion and the second elastic sealing portion open the third air outlet.

12. The refillable propane gas tank according to claim 11, wherein the conveying pipe comprises a first channel and a second channel, a first end of the second channel is provided with an inlet, a second end of the second channel is provided with an outlet, the inlet, the second channel, the outlet, the first channel, and the liquid injecting pipe are communicated in sequence; the fourth sealing valve comprises a third valve housing, a third pushing rod, and a fourth elastic sealing portion, the third valve housing and the liquid injecting head each comprises a second mounting channel, the third pushing rod is movable between the fourth open position and the fourth closed position in the second mounting channel; when the trigger device moves to the non-trigger position, the fourth elastic reset member is configured for pushing the third pushing rod to the fourth closed position, so that the third pushing rod pushes the fourth elastic sealing portion to seal and cover the outlet, so that the second channel is not in communication with the first channel and the liquid injecting pipe; when the trigger device moves to the trigger position, the trigger device is configured for pulling the third pushing rod to the fourth open position, so as to make the fourth elastic sealing portion open the outlet, so that the second channel is in communication with the first channel and the liquid injecting pipe; the fourth sealing valve further comprises a fifth elastic sealing portion, the fifth elastic sealing portion is sleeved on the third pushing rod, the fifth elastic sealing portion is positioned between the third pushing rod and an inner wall of the second mounting channel, and the fifth elastic sealing portion is configured for sealing a gap between the third pushing rod and the inner wall of the second mounting channel.

13. The refillable propane gas tank according to claim 12, wherein an end of the third pushing rod is provided with a first mounting slot, and the fourth elastic sealing portion is positioned in the first mounting slot.

14. The refillable propane gas tank according to claim 12, wherein the trigger device is a trigger lever, the trigger lever comprises a first operating portion, a first pulling portion, and a first pressing portion, the first operating portion, the first pulling portion, and the first pressing portion are sequentially connected, and the first pulling portion is connected to the third pushing rod; the trigger lever further comprises a rotating portion, and the rotating portion is positioned between the first pressing portion and the first pulling portion; the rotating portion is rotatably connected to the liquid injecting head, so that the trigger lever is rotatable between the trigger position and the non-trigger position; when the first operating portion of the trigger lever rotates to the trigger position, the first pulling portion is configured for pulling the third pushing rod to the fourth open position, so as to make the fourth elastic sealing portion open the outlet, so that the second channel is in communication with the first channel and the liquid injecting pipe; the first pressing portion pushes the second pushing rod to the third open position to make the second stop protrusion and the second elastic sealing portion open the third air outlet.

15. The refillable propane gas tank according to claim 1, wherein a top end of the first sealing valve and a top end of the second sealing valve are both lower than a top end of the valve main body.

16. The refillable propane gas tank according to claim 1, wherein the valve main body is connected to the mounting opening through threads, and the valve main body and the mounting opening are fixedly connected via an adhesive or a bolt.

17. The refillable propane gas tank according to claim 1, further comprising a first extension pipe, wherein the first extension pipe is connected to and communicated with the pressure relief channel, a side wall of the first extension pipe is provided with a second air outlet, and the second air outlet is in communication with the pressure relief channel.

18. The refillable propane gas tank according to claim 17, wherein the first extension pipe and the inner wall of the pressure relief channel are detachably connected.

19. The refillable propane gas tank according to claim 1, wherein the valve main body is provided with an accommodating groove, a bottom wall of the accommodating groove is recessed to form a limiting annular groove, a top end of the second sealing valve is positioned in the limiting annular groove, the top pressing structure is a convex annular top pressing structure, and the annular top pressing structure is positioned in the limiting annular groove.

20. The refillable propane gas tank according to claim 1, wherein the liquid injecting channel comprises a second stop inner wall and an annular guiding portion, the guiding portion is provided in the liquid injecting channel, the guide portion is provided with a first opening, the first opening is in communication with the liquid injecting channel, and an elastic sealing ring is provided between the guiding portion and the second stop inner wall; the liquid injecting pipe can abut against the first sealing valve through the first opening and the elastic sealing ring.

* * * * *